United States Patent [19]
Hamlen

[11] Patent Number: 5,849,428
[45] Date of Patent: Dec. 15, 1998

[54] MEMBRANE FOR HYDROGEN AND METHANOL FUEL CELL

[75] Inventor: Robert P. Hamlen, Bernardsville, N.J.

[73] Assignee: The United States of America as represented by the Secretary of the Army, Washington, D.C.

[21] Appl. No.: 641,611

[22] Filed: May 1, 1996

[51] Int. Cl.$^6$ ................................................. H01M 8/10
[52] U.S. Cl. .......................................... 429/33; 204/296
[58] Field of Search ........................ 429/30, 33; 204/296

[56] References Cited

U.S. PATENT DOCUMENTS

| | | | |
|---|---|---|---|
| 3,300,344 | 1/1967 | Bray et al. ................................ | 429/33 |
| 5,302,269 | 4/1994 | Eisman et al. ......................... | 429/33 X |
| 5,525,436 | 6/1996 | Savinell et al. ............................ | 429/30 |

*Primary Examiner*—John S. Maples
*Attorney, Agent, or Firm*—Michael Zelenka; George B. Tereschuk

[57] ABSTRACT

The migration of water and methanol across the hydrophilic membrane of hydrogen and methanol fuel cells from the anode to the cathode compartment decreases the electric energy output of such fuel cells. This migration is minimized by the precipitation in the pores of the membrane of zirconyl phosphate. A method and an apparatus for precipitaing zirconyl phosphate in the pores of membranes for hydrogen and methanol fuel cells are provided.

2 Claims, 1 Drawing Sheet

MEMBRANE FOR HYDROGEN AND METHANOL FUEL CELL

GOVERNMENT INTEREST

The invention described herein may be manufactured, used, and licensed by or for the Government for governmental purposes without the payment to me of any royalty thereon.

FIELD OF THE INVENTION

This invention relates in general to fuel cells, and, in particular, to a method of improving the performance of hydrogen and methanol fuel cells by treatment of the membrane between the cathode and anode compartments of such fuel cells.

BACKGROUND OF THE INVENTION

Fuel cells convert chemical to electrical energy by the oxidation of fuels such as hydrogen, methanol, or hydrocarbons, to form water and carbon dioxide. Oxygen, usually in the form of air, is supplied to a cathode compartment of the fuel cell, and fuel is supplied to the anode compartment. The anode and cathode compartments are separated from each other by a thin membrane which allows hydrogen cations, or protons, to migrate from the anode to the cathode compartment.

The generation of electric power by fuel cells is based on the oxidation and reduction reactions taking place at the electrodes in the anode and cathode compartments, respectively. In the cathode compartment, protons, $H^+$, entering the compartment by migration across the membrane from the anode compartment, react with dissolved oxygen, accepting electrons from an external electrical circuit via the cathode, and forming water. Dissolved oxygen is replenished by a flow of air through the electrolyte in the cathode compartment. Nitrogen from the air is vented to the atmosphere.

In the anode compartment, hydrogen is oxidized at the negative electrode (anode), forming protons, $H^+$, and releasing electrons into the external electrical circuit. The protons migrate across the membrane to the cathode compartment. The hydrogen in the anode compartment is replenished by an external hydrogen supply.

In a methanol-based fuel cell, the cathode reaction is the same as in a hydrogen-based fuel cell. In the anode compartment, methanol and water react to form carbon dioxide and protons, which migrate across the membrane to the cathode compartment; and electrons, which flow into the external electric circuit.

Two problems are encountered in the operation of fuel cells: (a) the loss of water from the membrane at temperatures exceeding 100° C., resulting in substantially decreased conductivity and fuel cell output, and (b) the migration of methanol across the membrane from the anode to the cathode compartment and oxidation of methanol in the cathode compartment with the generation of heat rather than electricity.

There is a need, therefore, for improved membranes for use in hydrogen and methanol fuel cells which operate at elevated temperatures and which minimize the diffusion of methanol and water from the anode to the cathode compartment of such fuel cells.

It is the object of the present invention to provide such improved membranes as well as apparatus and a method of making them.

SUMMARY OF THE INVENTION

The improved fuel cell membranes of this invention are made of polytetrafluoroethylene (PTFE) having sulfonate side chains ($-CF_2-SO_3H$). This material is supplied by E. I. duPont de Nemours and others, the duPont material having the tradename Nafion@. The membranes are about 50 to 250 microns thick and have clusters of hydrophilic material providing channels approximately 4–5 nanometers in diameter for migration of protons, water, and water-soluble substances such as methanol. The migration of water and methanol across the membrane is reduced or eliminated by the deposition in the pores of the membrane of amorphous zirconyl phosphate, $ZrO(H_2PO_4)_2$. This deposition is accomplished by the addition of aqueous zirconyl nitrate, $ZrO(NO_3)_2$, to a first electrolyte compartment and phosphoric acid, $H_3PO_4$, to a second electrolyte compartment, with the membrane forming the boundary between the first and second electrolyte compartment. A voltage is applied across two electrodes, one each dipping into the electrolyte in the first and second electrolyte compartment, the positive voltage being applied to the electrode of the compartment containing the zirconyl nitrate, and the negative voltage being applied to the electrode of the compartment containing the phosphoric acid. This causes zirconyl ions to migrate into the membrane from the first compartment and dihydrophosphate ions to migrate into the membrane from the second compartment. Where the ions meet in the membrane, zirconyl phosphate, being quite water-insoluble, precipitates as a gelatinous mass in the pores of the membrane.

DETAILED DESCRIPTION OF THE INVENTION

Figure 1:
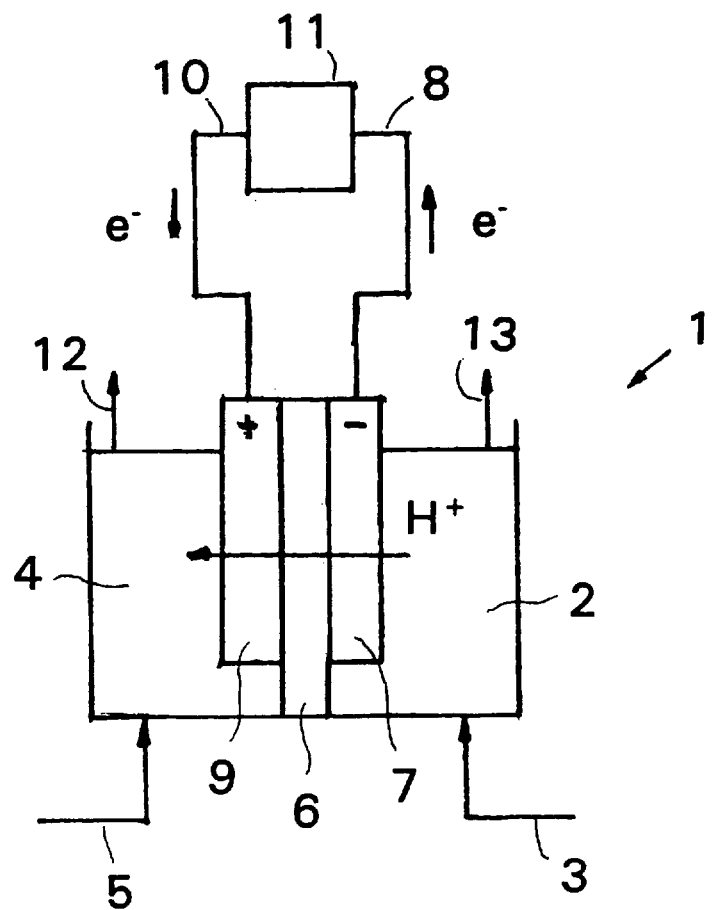
FIG. 1 schematically illustrates the components of a fuel cell.

With reference to FIG. 1, in a typical hydrogen-oxygen fuel cell 1, hydrogen is fed to the anode compartment 2 of the cell via a tube 3, and oxygen (in the form of air) is fed to the cathode compartment 4 via a tube 5. Pure oxygen or air-oxygen mixtures may be used to provide oxygen for the cathode compartment. The anode and cathode compartments are filled with electrically-conductive aqueous electrolytes, and the anode 7 and cathode 9 are immersed in the electrolytes in their respective compartments and in intimate contact with the membrane 6, a proton exchange membrane, wherein a hydrated proton is the electrolytic conductor within the membrane. On the anode 7, there is a porous catalytic/conductive layer, on which the hydrogen is oxidized according to the reaction

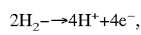

with the electrons entering the external electric circuit through a wire 8 attached to the anode 7. The protons migrate across the membrane 6 from the anode compartment 2 to the cathode compartment 4.

In the cathode compartment 4, there is a porous catalytic/conductive layer on the cathode 9 in which oxygen reacts with protons,

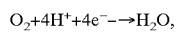

to produce water and energy in the external circuit. The electrons needed for this reaction are supplied from the external circuit via a wire 10 connected to the cathode 9. The electric energy delivered by the fuel cell is utilized or dissipated in an electrical load 11. The direction of electron flow is indicated by e and arrows, and the polarity of the cell by + and −, in FIG. 1. The direction of migration of protons across membrane 6 is indicated by H+ and an arrow in FIG. 1. Nitrogen coming into the cathode compartment with the air supplying oxygen is allowed to escape from the electrolyte into the atmosphere at 12.

As an alternative to hydrogen as the fuel, methanol may be fed to the anode compartment 2 via tube 3, and the electrochemical reaction taking place in the anode compartment 2 is $$CH_3OH + 3H_2O \rightarrow CO_2 + 6H^+ + 6e^-.$$

Carbon dioxide leaves the anode compartment 2 at 13. The electrochemical reaction taking place in the cathode compartment 4 is $$6H^+ + 1.5O_2 + 6e^- \rightarrow 3H_2O.$$

Typical cell voltages range from 0.3 to 1.1 volts, and current densities across the membrane range from 10 to 500 milliamperes per square centimeter (ma/cm2) of membrane area, depending on temperature and the activities of the catalysts in the electrodes. The fuel cell membranes of this invention are made of polytetrafluoroethylene (PTFE) having sulfonate side chains ($-CF_2-SO_3H$). This material is supplied by E. I. duPont de Nemours and others, the duPont material having the tradename Nafion@. The membranes are about 50 to 250 microns thick and have clusters of hydrophilic material providing channels approximately 4–5 nanometers in diameter for migration of protons, water, and water-soluble substances such as methanol.

Two problems are encountered in the operation of fuel cells: (a) the loss of water from the membrane at temperatures exceeding 100° C., resulting in substantially decreased conductivity and fuel cell output, and (b) the migration of methanol across the membrane from the anode to the cathode compartment followed by the direct oxidation of methanol in the cathode compartment with the generation of heat rather than electricity.

Figure 2:
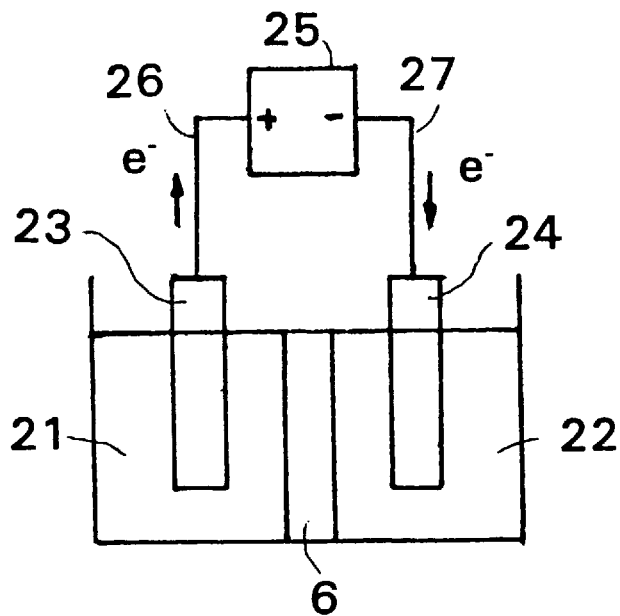
FIG. 2 schematically illustrates the apparatus used for the precipitation of zirconyl phosphate in the pores of the membrane for a fuel cell.

These two problems are mitigated by the precipitation of zirconyl phosphate in the pores of the membrane 6. Zirconyl phosphate inhibits the migration of water and methanol across the membrane. With reference to FIG. 2, amorphous zirconyl phophate, $ZrO(H_2PO_4)_2$, is precipitated by the addition of an aqueous solution of zirconyl nitrate, $ZrO(NO_3)_2$, to a first electrolyte compartment 21, and aqueous phosphoric acid, $H_3PO_4$, to a second electrolyte compartment 22, with the membrane 6 placed therebetween, and passage through the electrolyte compartments 21 and 22 of an electric current by application of a voltage differetial of 2 to 5 volts across two electrodes, 23 and 24, immersed in the electrolytes in the first and second electrolyte compartments 21 and 22, respectively. Electrode 23 is the positive electrode, and electrode 24 is the negative electrode. This voltage is provided from a DC voltage source 25 connected to the electrodes by wires 26 and 27.

The electric current flow caused by application of this voltage causes zirconyl ion, $ZrO^{++}$, to migrate from compartment 21 into membrane 6, and dihydrophosphate ion, $H_2PO_4^-$, to migrate into the membrane 6 from compartment 22. Where these ions meet in the membrane, zirconyl phosphate, $ZrO(H_2PO_4)_2$, being very water-insoluble, will precipitate in a non-crystalline, gelatinous form.

It will be understood that the above description of the present invention is susceptible to various modifications, changes, and adaptations, and the same are intended to be comprehended within the meaning and range of equivalents of the appended claims.

I claim:

1. A membrane made of sulfonated perfluorinated polymer having pores partially filled with zirconyl phosphate.

2. The membrane, as recited in claim 1 further comprising:

a first electrolyte compartment having a first electrode with an electrolyte of an aqueous solution of zirconyl nitrate;

a second electrolyte compartment having a second electrode with an electrolyte of phosphoric acid, the membrane forming the boundary between said first and said second electrolyte compartments;

said first electrode and second electrode being electrically connected to a voltage source, said voltage source providing a positive voltage to said first electrode and a negative voltage to said second electrode; and said zirconyl phosphate being precipitated in the pores of the membrane.

* * * * *